US009922343B2

(12) United States Patent
Brill et al.

(10) Patent No.: US 9,922,343 B2
(45) Date of Patent: Mar. 20, 2018

(54) DETERMINING CRITERIA FOR SELECTING TARGET AUDIENCE FOR CONTENT

(71) Applicant: Facebook, Inc., Menlo Park, CA (US)

(72) Inventors: Jacob Andrew Brill, San Francisco, CA (US); Gianluca Iannaccone, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/973,622

(22) Filed: Dec. 17, 2015

(65) Prior Publication Data

US 2017/0178184 A1   Jun. 22, 2017

(51) Int. Cl.
*G06Q 30/02*     (2012.01)
*G06Q 50/00*     (2012.01)

(52) U.S. Cl.
CPC ..... *G06Q 30/0255* (2013.01); *G06Q 30/0277* (2013.01); *G06Q 50/01* (2013.01)

(58) Field of Classification Search
CPC .. H04N 21/251; H04N 21/252; H04N 21/258; H04N 21/25883; H04N 21/25891; H04N 21/2668; H04N 21/442; H04N 21/4524; H04N 21/4532; G06Q 30/0255; G06Q 30/0277; G06Q 50/01
See application file for complete search history.

(56) References Cited

U.S. PATENT DOCUMENTS

| | | | |
|---|---|---|---|
| 2010/0153885 A1* | 6/2010 | Yates | G06F 3/0482 715/841 |
| 2012/0084155 A1* | 4/2012 | Roy | G06Q 30/0273 705/14.69 |
| 2012/0278142 A1* | 11/2012 | Li | G06Q 30/02 705/14.1 |
| 2013/0060854 A1* | 3/2013 | Nakano | H04N 1/00153 709/204 |
| 2013/0085859 A1* | 4/2013 | Sim | G06Q 30/02 705/14.58 |
| 2014/0012659 A1* | 1/2014 | Yan | G06Q 30/0241 705/14.42 |
| 2015/0100570 A1* | 4/2015 | Zent | G06F 17/3053 707/723 |

* cited by examiner

*Primary Examiner* — Benjamin R Bruckart
*Assistant Examiner* — Tien M Nguyen
(74) *Attorney, Agent, or Firm* — Fenwick & West LLP (57) ABSTRACT

An online system receives a content item from content providers and a target audience criterion and for targeting the received content item. The online system determines recommendations of modifications of the target audience criteria such that users of the modified target audience criteria have a higher likelihood of interacting with the content item compared to the received target audience criteria. The online system stores measures of interest of subsets of users for different topics. The online system determines topics associated with the content item and determines measures of interest of subsets of users in the content item based on topics associated with the content item. The online system provides recommendations for modifying the target audience criteria based on the determined measures of interests of users.

20 Claims, 8 Drawing Sheets

Current target: Age: 30-45, Gender: Male

The top segment clusters in your current target are:

Estimated CTR            Include in campaign

1.2% — (1) Age: 31-33, Location: US— Southeast    ☒ — 720

0.9% — (2) Age: 28-30, Location: US— Southeast    ☒

0.81% — (3) Age: 28-30, Location: US— West    ☒

0.65% — (4) Age: 25-26, Location: US— West, Southeast    ☒

0.4% — (5) Age: 30, Location: US— West    ☐

Specify new content
Exclude subset — 730

FIG. 7

DETERMINING CRITERIA FOR SELECTING TARGET AUDIENCE FOR CONTENT

BACKGROUND

This invention generally relates to online content distribution, and, more specifically, to determining criteria for selecting a target audience for receiving content.

Content providers produce content that is targeted to certain audiences within online systems. Users interact with content received from the online system. These user interactions include accessing and viewing the content, indicating to the online system that they like the content, recommending the content to other users, commenting on the content, executing a transaction in response to viewing the content, and the like.

Users typically get a large number of content items and interact with only a few content items received. Online systems often send content items to users that are ignored by the users receiving the content item. As a result, the online system wastes resources while sending these content items. Content providers would like to send content to users that are likely to interact with the content. Content providers typically specify criteria describing the users to whom the content should be sent, for example, their age group, gender, and so on, but sometimes it is difficult for content providers to determine best set of users to which the audience should be limited, and the right audience size. The criteria provided by content providers is often too broad resulting in content being sent to a large audience, including many users that are not likely to interact with the content. If the content provider is paying the online system for sending the content to users, the content provider ends up wasting their resources by sending content to users that do not interact with the content.

SUMMARY

An online system helps a content provider to determine the most effective target audience criteria for use in determining a target audience for receiving content. The online system stores user profiles describing users to whom content may be provided, including likes and dislikes of the users, interactions with other users in the online system, etc. The online system receives from the content provider information identifying a content item and target audience criteria for sending the content item to users. The target audience criteria maps one or more user attributes to sets of values. For example, the target audience criteria may specify that the users targeted for receiving the content items should have a gender listed as male, and an age in the range of 20-40 years, and thus gender and age are user attributes, and values associated with those are male and 20-40 years, respectively. In some embodiments, the content provider selects a target audience using a user interface that is prefilled with a very broad audience (e.g., all genders, a broad age range, a location encompassing a large population, etc.), and the content provider can modify the prefills to the audience the content provider selects (e.g., males, age 20-40 years, in California).

In some cases, the audience selected by the content provider is not necessarily the best audience to target, or the selection encompasses too many users. The online system can help the content provider identify better options for the audience (e.g., one or more subsets of users within the broad audience the content provider selected). The online system does this by determining modified targeting criteria such that users satisfying the modified targeting criteria have a higher likelihood of being interested in the content item than users satisfying the received targeting criteria. The online system determines content attributes describing the content item (e.g., extracts keywords, such as "university" or "college," or other information from the content item, accesses information that the system has about the content provider and its past history with serving content, etc.). The online system selects a user attribute (e.g., age) and determines a plurality of subsets of values of the selected user attribute (e.g., ages 18-20, 21-25, 26-30, etc.). Each subset of values of the selected user attribute is associated with a subset of users that meet those values (e.g., fall in the age range). The online system determines a measure of interest in the content item for users of each subset (e.g., users age 18-20 are more interested in content about colleges). The measure of interest may be determined based on a match of user attributes of users of the subset with content attributes describing the input content item. The online system selects a subset of values (e.g., age range 18-20 based on the measure of interest of users of the subset. The online system recommends a modified target audience criteria based on the selected subset of values (e.g., target audience of users age 18-20, in the Bay Area, having posted or shared content about a college).

In an embodiment, the online system receives a selection of subset of values of the user attribute from the content provider and determines the modified target audience criteria based on the received selection. For example, the system can prefill a user interface for the content provider with the modified target audience or provide a few options from which the content provider can select.

The features and advantages described in this summary and the following detailed description are not all-inclusive. Many additional features and advantages will be apparent to one of ordinary skill in the art in view of the drawings, specification, and claims hereof.

DETAILED DESCRIPTION

Overview of System Environment

Figure 1A:
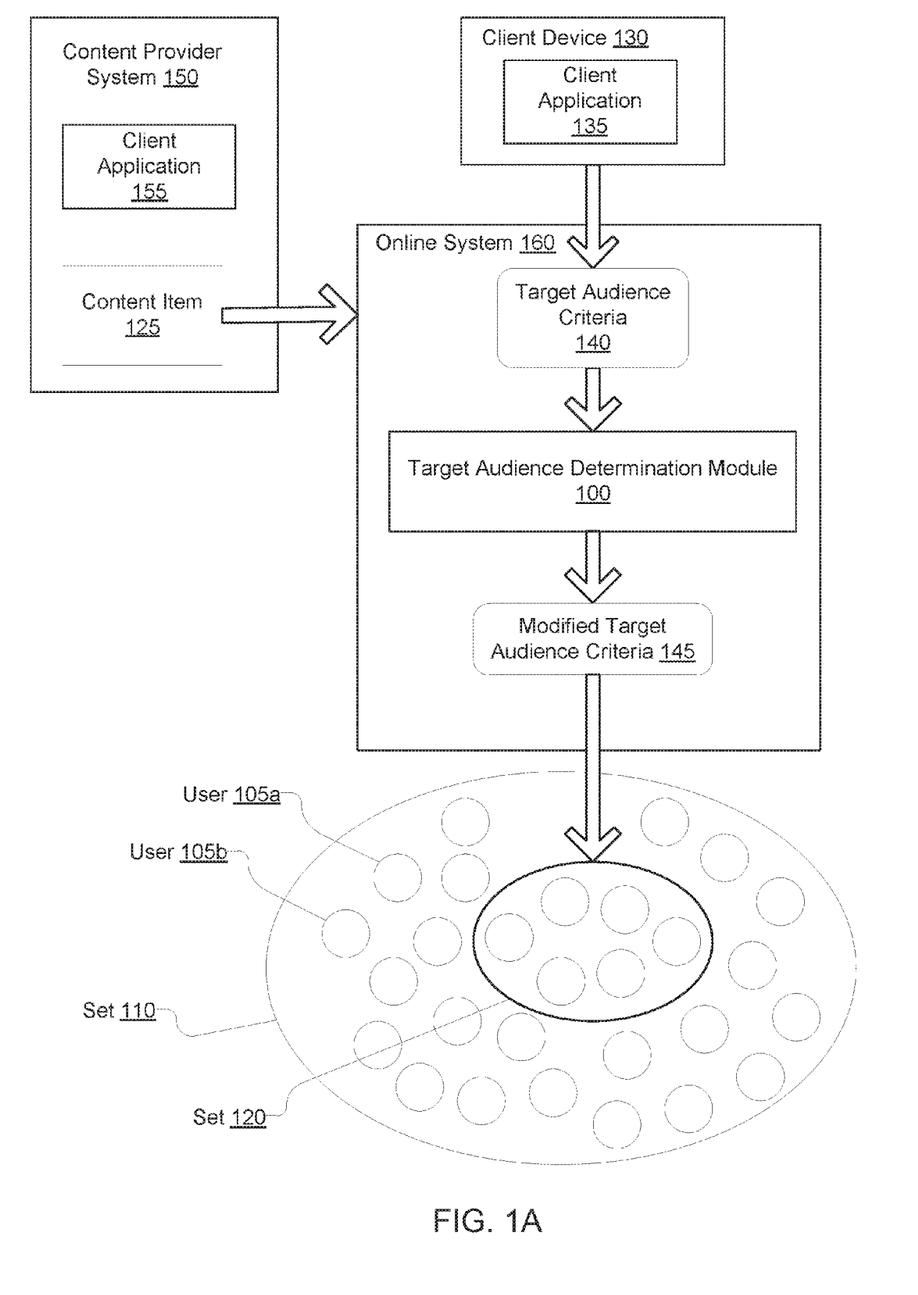
FIG. 1A shows the overall system environment for determining a criterion for selecting target audience for a content item, in accordance with an embodiment.

FIG. 1A shows the overall system environment for determining the criteria for selecting target audience that is likely to be interested in a content item, in accordance with an embodiment of the invention. The overall system environment includes one or more client devices 130, one or more content provider systems 150, and an online system 160. Other embodiments may include more or fewer systems. Conventional components such as network interfaces, security mechanisms, load balancers, failover servers, management and network operations consoles, and the like are not shown so as to not obscure the details of the system.

FIG. 1A also shows the users 105 of the online system 160. The users 105 interact with the online system via the client device 130. FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The client device 130 used by users 105 for interacting with the online system 160 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 130 can be any device having computer functionality, such as a personal digital assistant (PDA), mobile telephone, smartphone, wearable device, etc.

A client device 130 includes a client application 135 which allows the user to access the online system 160. The client application 135 could be used by the user to interact with content provided by the online system to the user. For example, the user may retrieve the content for viewing, indicate that the user likes the content, post comments about the content, recommend the content to other users, indicate a dislike towards the content, flag the content, or close or hide the content window, thereby indicating that the user is not interested in the content.

The content provider system 150 is a system used by content providers for interacting with the online system 160, for example, for providing content and information related to the content. Content provided by content providers includes video content, audio content, text, or any other type of content. The content may be sponsored content. The content provider may have to pay the online system 160 for distributing content on behalf of the content provider. Accordingly, there is an aggregate cost associated with content distributed by the online system 160 for a content provider. Furthermore, the online system 160 uses its resources for distributing content. Accordingly, there is a cost associated with distribution of content that is based on the amount of resources of the online system that are used for distributing content.

Content providers may use an online system to host their content and let users access the content. Alternatively, content providers provide target audience criteria for the online system. The online system may receive content items and corresponding target audience criteria from the content providers via the content provider system 150. The online system 160 selects users that satisfy the target audience criteria and send the content to the selected users. Accordingly, content providers use channels of an online system for providing their content to the users. Examples of these channels include feed, email, or channels for propagating sponsored content.

In an embodiment, the content provider system 150 interacts with the online system 160 using application programming interfaces (APIs) of the online system 160. The content provider system 150 includes a client application 155 that allows users associated with content provider system 150 to interact with the online system 160. The client application 155 may present a user interface that is different from the user interface of the client application 135.

The interactions between the client devices 130 or content provider system 150 and the online system 160 are typically performed via a network, for example, via the Internet. The network enables communications between the client device 130 and the online system 160. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

The online system 160 receives a target audience criteria 140 for a content item from a system administrator or a privileged user associated with content provider system 150. The target audience criteria 140 specifies characteristics of users to whom the content item should be sent by the online system 160. The online system 160 can determine the set 110 of users for sending the content item based on the target audience criteria 140. A system administrator or a privileged user associated with content provider system 150 uses the client application 135 to specify the target audience criteria 140.

Content providers typically specify very broad criteria that cover a very large set of users in order to avoid excluding users that may be interested in the content. For example, the online system 160 may receive from a content provider, criteria that targets users associated with a large geographical region, for example, an entire country, users having any gender and a very broad age range. For example, the content provider may specify the target audience criteria 140 as including all users, irrespective of their gender, that reside within the United States of America who are in the age group of 15-55. The set of users that satisfy the specified target audience criteria 140 is set 110 as indicated in FIG. 1A.

Since the received target audience criteria 140 is very broad, the set 110 of users that satisfy the received target audience criteria 140 may include a large number of users that are not interested in the content item. The users may ignore the content item or interact with the online system 160 indicating a dislike for the content item. Accordingly, the resources of the online system 160 or the content provider used for sending the content item to these users get wasted.

The target audience determination module 100 of the online system 160 interacts with the content provider via the content provider system 150 to improve the target audience criteria 140 to the modified target audience criteria 145 satisfied by the set 120 of users. Statistically, the users belonging to the set 120 that satisfy the modified target audience criteria 145 are more likely to be interested in the content item than users belonging to set 110. For example, if each user was associated with a measure of interest with the content item, a randomly selected user from set 120 is likely to have a higher measure of interest with the content item than a randomly selected user from the set 110. Accordingly, a measure of interest in the content item per user for users of set 120 is likely to be higher than a measure of interest in the content item per user of users of set 110. Alternatively, the online system 160 may determine an aggregate measure of interest of users of a set, for example, a sum, average, median, or any other statistical aggregate of the measures of interests of individual users belonging to the set. The set 120 is determined such that the aggregate measure of interest in the content item of users of set 120 is higher than the aggregate measure of interest in the content item of users of set 110.

The target audience determination module 100 determines various attributes of the content item, for example, the subject of the content item, category of the content, attributes of the content provider, and so on. The target audience determination module 100 also analyzes users having various characteristics or user attributes to determine measures of interests of users having different characteristics in content items having attributes matching the received content item. The target audience determination module 100 makes recommendations of additional criteria based on characteristics of users. These recommendations specify criteria that are more specific compared to the target audience criteria 140 received from the content provider. For example, if the received target audience criterion specifies a broad range of values for a user attribute, the recommendations specify relatively narrower ranges of the same user attribute. Alternatively, the recommendations may specify values for new user attributes that are not included in the received target audience criteria. For example, if the target audience criteria 140 specify a country as the geographic location, the target audience determination module 100 may specify specific states for targeting the content. Similarly, if the target audience criteria 140 specifies a broad range of age, the target audience determination module 100 may specify a smaller range of age.

In an embodiment, the target audience determination module 100 also provides estimates of measures of interest of the users in the content item for specific sets of users associated with specific values or sets of values of user attributes. For example, the target audience determination module 100 may specify multiple ranges of age and an aggregate measure of likelihood of interest of users towards the content item for each range of age. This allows the content provider to select a particular set of values for a user attribute, for example, a range of age, a gender, an interest, a dislike, a location, a history of posting on a particular topic or sharing posts, a number of connections who have an interest in a topic, a connection to certain business pages in the system, and so on, such that the modified target audience criteria based on the selection results in the target audience having a higher likelihood of being interested in the content item or higher likelihood of interaction with the content item.

The content provider may select one or more of the recommended criteria suggested by the target audience determination module 100. As a result, the online system 160 determines a modified target audience criteria 145 for determining the target users receiving the content item. The amount of resources used for providing the content item to users of the set 120 may be associated with a measure of cost. Accordingly, the online system 160 or the content provider may determine the modified target audience criteria 145 based on the overall measure of cost of sending the content item to the users of the set 120.

In some embodiments, the content is distributed by a system that is not the online system but a system that communicates with an online system to obtain the necessary user information. The system may communicate with the online system, for example, using APIs provided by the online system.

The online system 160 determines various content attributes associated with a content item for determining whether a user is interested in the content item. The online system 160 matches user attributes against the content attributes to determine whether a user is likely to be interested in the content item. The online system 160 matches user attributes against attributes that describe the content item, attributes that describe the content provider that provided the content item, attributes that describe other content items that are similar to the content item, attributes that describe other content providers that are similar to the content provider or provide content matching the content item, and the like.

Figure 1B:
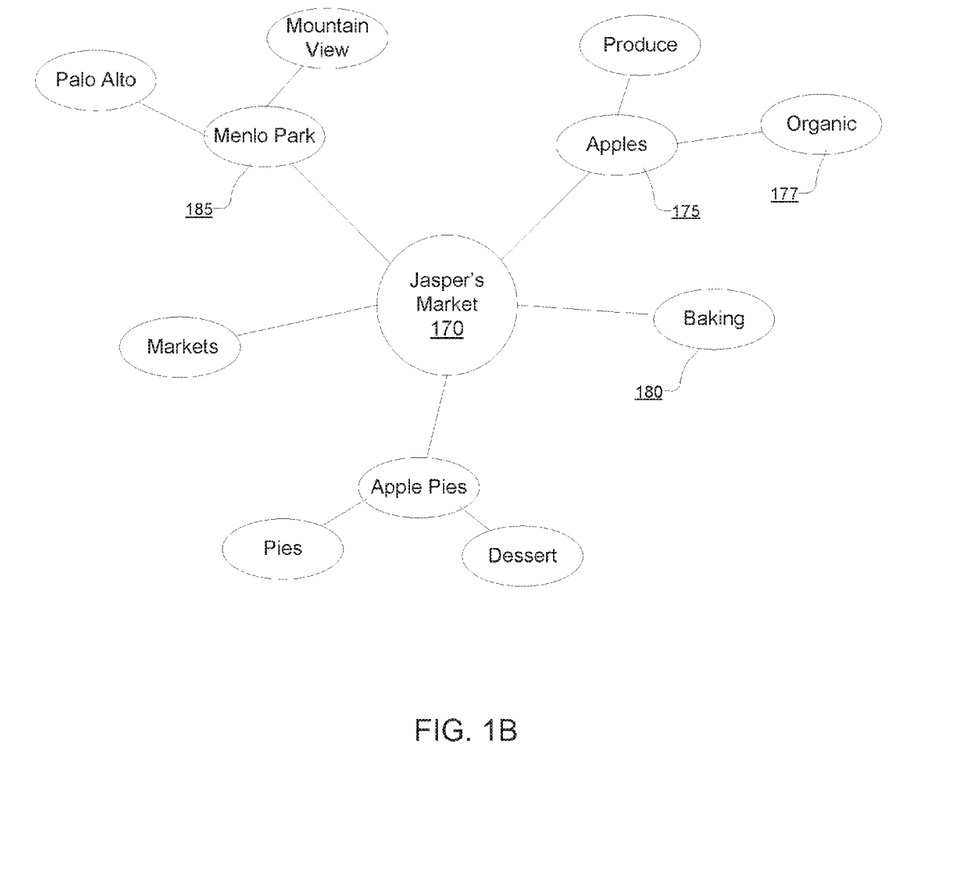
FIG. 1B shows examples of content attributes used for selecting target audience for a content item, in accordance with an embodiment.

FIG. 1B shows examples of content attributes used for selecting target audience for the content item, in accordance with an embodiment. The content item is associated with a content provider 170 indicated as Jasper's Market. The online system 160 stores various attributes describing content providers that provided a content item and associates them with the content item. As illustrated in FIG. 1B, the attributes of the content provider 170 include locations 185, various products or services 175 provided by the content provider 170, attributes 177 describing the products and services 175, activities 180 associated with the provider, and so on.

The online system 160 may receive attributes describing the content item from the content provider, for example, the content provider may provide metadata describing the content item. As an example, online system 160 may receive information from the content provider indicating that a video provided as a content item concerns sports activities or fashion or automobiles.

In an embodiment, the online system 160 performs various types of analysis of the content to determine content attributes for the content item. For example, the online system 160 performs image analysis of a video to determine attributes of the video. The online system 160 may analyze text associated with the content to determine topics associated with the content item. For example, a content item may include text or the online system 160 may determine text related to the content item by transcribing any audio in the content item.

System Architecture

Figure 2:
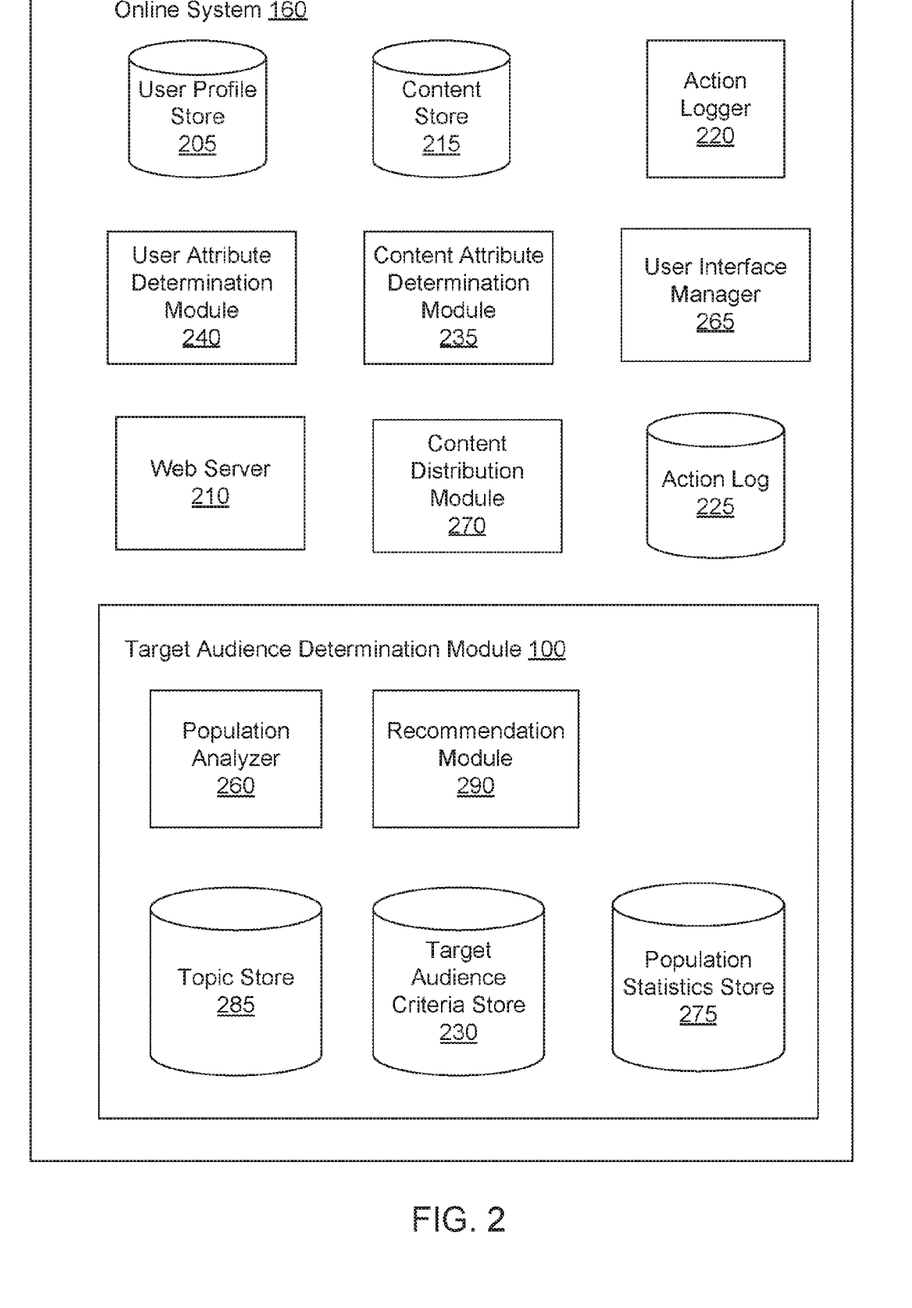
FIG. 2 illustrates the system architecture of an online system for determining criteria for selecting target audience for a content item, in accordance with an embodiment.

FIG. 2 illustrates the system architecture of an online system for determining criteria for selecting target audience for a content item, in accordance with an embodiment. The online system 160 includes a user profile store 205, a content store 215, a web server 210, an action logger 220, an action log 225, a content attribute determination module 235, a user attribute determination module 240, a content distribution module 270, a user interface manager 265, and a target audience determination module 100.

The user profile store 205 stores user profiles of users of the online system 160. A user profile includes various data fields storing information describing the user including, but not restricted to, biography, demography, and descriptive information, such as gender, hobbies, location, work experience, educational history, and the like. A user profile of a user includes information provided by the user, for example, address, ethnicity, age, interests, and so on. The user profile of a user also includes user attributes determined by the online system 160 based on information stored on the online system 160.

The user attribute determination module 240 determines user attributes describing the user. The user attribute determination module 240 infers these user attributes based on information associated with the user collected by the online system 160, for example, the types of content accessed by the user, types of websites accessed by the user, topics associated with content accessed by the user, and so on. Examples of user attributes inferred by the user attribute determination module 240 include user attributes indicative of interests of the user based on the interactions of the user with the online system 160 or external systems such as websites associated with the online system 160. For example, the user attribute determination module 240 may infer interests of the user based on interactions of the user with the online system 160 including the type of content accessed by the user in the past, topics mentioned in communications of the user with other users, topics mentioned in comments posted by the user, and so on.

The content store 215 stores various types of content items received by the online system 160 from content providers. Examples of content items include video content, audio content, text content, an image, a link, and the like. Example of a content item also includes a web page that combines one or more different types of content items, for example, text, images, and videos. A content item may be a sponsored content item that is being sponsored by a content provider. A sponsored content item is also referred to herein as a promotional content item. A content item could be an advertisement of a product or service offered by a vendor.

The web server 210 links the online system 160 via a network to one or more client devices 130. The web server 210 serves web pages, as well as other web-related content, such as Flash, XML, and so forth. The web server 210 provides the functionality of receiving and routing messages between the online system 160 and the client devices 130 as well as other external systems. These messages can be instant messages, queued messages (e.g., email), text and SMS (short message service) messages, or any other suitable message type. In some embodiments, a message sent by a user to another can be viewed by other users of the online system 160, for example, by the connections of the user receiving the message. An example of a type of message that can be viewed by other users of the online system 160 besides the recipient of the message is a wall post.

The user interface manager 265 configures user interfaces for presentation to the users via the client applications 135. These include user interfaces for receiving interactions from users by the online system 160, user interfaces for receiving information describing content items and content providers, user interfaces for presenting recommendations for modifying the target audience criteria, and the like.

The action logger 220 is capable of receiving communications from the web server 210 about user actions within and/or external to the online system 160. The action logger 220 populates the action log 225 with information about user actions to track them. When a user performs an action using the online system 160, action logger 220 adds an entry for that action to the action log 225. Any action that a particular user takes with respect to another user is associated with each user's profile, through information maintained in a database or other data repository, such as the action log 225. Such actions may include, for example, viewing content, attending an event posted by another user, posting a comment, "liking" a content item, among others.

The action log 225 stores information describing user actions of the online system 160. The user actions may be performed by the user with the online system 160. Alternatively, the user actions may be performed by the users with external systems and information describing these actions communicated to the online system 160 by the external systems. Users interact with various objects on the online system 160, and information describing these interactions is stored in the action log 225. Some forms of interactions with objects include: retrieving and interacting with the content, commenting on content, sharing links to content, recommending content to other users, indicating a like or dislike for a content item, communicating with other users, becoming member of a group, indicating interest in attending an event, and so on.

The content attribute determination module 235 determines content attributes describing content present in content store 215. The content attribute determination module 235 determines content attributes for a content item from various entities represented in the online system 160 that are associated with the content item, for example, the content item itself, provider of the content item, other content items that are similar to the content item, other content providers that provide similar content, and so on.

The content attribute determination module 235 may analyze metadata of content items to determine certain attributes. For example, the online system 160 may receive metadata describing content items from content providers. The metadata may describe certain categories describing the content. For example, metadata describing a video may indicate that the video concerns fashion, movies, cars, sports, or any specific activity, entities, or products.

The content attribute determination module 235 analyzes text associated with a content item to determine content attributes, for example, topics associated with the content item. The content attribute determination module 235 may receive text associated with the content item as part of the content item, for example, if the content is a web page. The content attribute determination module 235 may convert audio associated with content to text by transcribing the audio. The content attribute determination module 235 may obtain text associated with the content provider of the content, for example, by accessing a web site of the content provider or by analyzing data provided by the content provider describing various activities or entities associated with the content provider, for example, any products or services provided by the content provider.

The content attribute determination module 235 determines content attributes describing topics associated with the content. The content attribute determination module 235 analyzes text associated with the content to determine various keywords occurring in the text. The content attribute determination module 235 analyzes the keywords to determine topics associated with the content.

In an embodiment, if the content is associated with a particular topic, the content attribute determination module 235 identifies other topics related to that topic. For example, if the content is associated with a particular sports activity, the content attribute determination module 235 associates related sports activities with the content. As an example, if a content item is associated with a game played by a particular team, the content attribute determination module 235 associates other teams playing that particular game with the content.

In an embodiment, the content attribute determination module 235 relates various topics together as groups or categories such that a user interested in a particular topic is likely to be interested in other topics within that group or category as well. For example, the content attribute determination module 235 relates topics related to fashion in one group, topics related to particular types of sports activities as other groups and so on. If the content attribute determination module 235 determines that a content item is associated with a particular topic belonging to a group, the content attribute determination module 235 associates other topics from the group with that content.

The content attribute determination module 235 associates a content item with various topics and stores a measure of strength of association between the topic and the content item. A topic has a higher strength of association if the topic is directly mentioned in the content item rather than mentioned in other content items related to the content item. Similarly, content attribute determination module 235 determines the strength of association between a topic and a content item to be proportionate to the frequency of occurrence of keywords associated with the topic in the content item. For example, a web page has high strength of association with the topic sports if the web page has several occurrences of names of different types of sports or different teams or players associated with sports. On the other hand, the web page has low strength of association with the topic sports if the web page has only one or two mentions of keywords associated with the sports topic.

In an embodiment, the content attribute determination module 235 associates a content with locations associated with the content provider. The content attribute determination module 235 may receive and store information associating a content provider with one or more locations where the content provider offers certain products or services. The content attribute determination module 235 associates these locations with content obtained from the content provider. In an embodiment, the content attribute determination module 235 associates a content with categories associated with products and services offered by the content, for example, groceries, sports, news, electronics, real estate, and the like.

The target audience determination module 100 determines recommendations for modifying a target audience criteria for a content item such that the modified target audience criteria targets fewer users compared to the received target audience criteria. However, the users that satisfy the modified target audience criteria are determined to have a higher expected likelihood of being interested in the content item than the users satisfying the received target audience criteria.

The target audience determination module 100 includes a population analyzer 260, a topic store 285, a population statistics store 275, a recommendation module 290, and a target audience criteria store 230. The population analyzer 260 analyzes the users of the online system 160 to determine characteristics of various subsets of the population, each subset having particular characteristics as defined by the user attributes of the sets of users. The population analyzer 260 determines various subsets of users, for example, a subset S1 of users having age in a first range (for example, 10-15 years), a subset S2 of users having age in a second range (for example, 16-20 years), a subset S3 of users having age in a third range (for example, 21-55 years), and so on. Similarly, the population analyzer 260 determines subsets based on sets of values of other user attributes, for example, subsets based on financial status, ethnicity, location, gender and so on. In an embodiment, the population analyzer 260 determines subsets having specific values for combination of attributes, for example, gender as male and age group in the range of 10-15, gender as female and age group in the range of 10-15, gender as male and age group in the range of 15-20, gender as female and age group in the range of 15-20, and so on.

The population analyzer 260 stores various topics associated with content in the topic store 285. These include topics identified based on the text occurring in the content, text obtained by transcribing audio in the content, topics obtained by performing image analysis of the content, topics obtained by analyzing information describing the content providers, and so on. The topics stored in the topic store 285 include broad categories of topics, for example, sports, fashion, food, recreation, and so on, as well as more specific topics within each category. For example, the topic store 285 may store various sports within the sports topic such as football, soccer tennis, and so on. Similarly, the topic store 285 may store various types of foods within the food topic such as Chinese food, Indian food, fast food, snacks, and so on.

The population analyzer 260 determines for each subset of users, an aggregate measure of likelihood of interest of the users of the subset in particular topics. In an embodiment, the population analyzer 260 determines a measure of likelihood of interest in a topic based on a rate of interaction of the users of the set with content items determined to be associated with that topic. The interactions associated with a content item include retrieving the content item, viewing the content item, recommending the content item, liking the content item, clicking on a link associated with the content, performing a transaction associated with the content via the online system 160, for example, making a purchase, and so on. The population analyzer 260 determines the aggregate measures of interest for each subset of users based on a weighted aggregate of past interactions of users of the set for specific topics. Accordingly, the population analyzer 260 determines a score for each subset of user and a topic, the score based on a rate of past interactions of users when presented with a content item associated with the topic. The population analyzer 260 normalizes the score values to allow comparison between behaviors of various subsets of users. In an embodiment, the population analyzer 260 stores in the population statistics store 275, a mapping table that maps subsets of users and topics to a measure of likelihood of interest of the users of the subset in the topic.

The population analyzer 260 weighs different types of interactions differently. In an embodiment, the population analyzer 260 weighs interactions indicative of user liking a content item positively and interactions indicative of user dislike towards the content item negatively. Similarly, the population analyzer 260 performs sentiment analysis of communications and comments of the users to associate the interaction with a measure of sentiment towards a topic. The population analyzer 260 assigns positive weights to interactions associated with a positive sentiment towards a topic and assigns negative weights to interactions associated with a negative sentiment towards the topic.

The recommendation module 290 analyzes a given target audience criteria and determines subsets of users that satisfy the given target audience criteria. The recommendation module 290 receives various topics associated with a given content item and uses the information available in the population statistics store 275 to make recommendations to the content provider identifying subsets of users that are likely to have high measures of interests in the topics of the content item. In an embodiment, the recommendation module 290 determines various topics associated with a content item. The recommendation module 290 determines a measure of likelihood of interest in the topics associated with the content item for specific subsets of users. For each subset of users, the recommendation module 290 determines a weighted aggregate of measure of likelihood of interest in the topics of the content item. In an embodiment, the recommendation module 290 weighs each measure of likelihood of interest for a topic of the content item based on the strength of association between the topic and the content item.

The recommendation module 290 sends recommendations of specific subsets of users that are likely to have high interest in the content item to the content provider system 150. The recommendation module 290 may send a recommendation indicating that the content provider should identify a different content item for specific subsets of users that are likely to have low interest in the content item.

The target audience criteria store 230 stores a representation of target audience criteria received from the provider of the content. The target audience criteria may be specified as expressions, for example, age of users within a particular range, minimum educational qualification, ethnicity within an enumerated set, gender specified as a particular value(s), and so on. The target audience determination module 100 interacts with the content providers via the user interface manager 265 to provide recommendations for revising the target audience criteria. The target audience determination module 100 determines a modified target audience criteria based on input from the content provider and stores the modified target audience criteria in the target audience criteria store 230.

In one embodiment, the online system 160 is a social networking system that allows users to join a social network, establish connections with users of the social network, and share content with users of the social network. In these embodiments, the user attribute determination module 240 infers user attributes based on information describing the user's connections as well as interactions between users. For example, user interests are inferred based on topics mentioned by the user in user interactions with other users.

Overall Process

Figure 3:
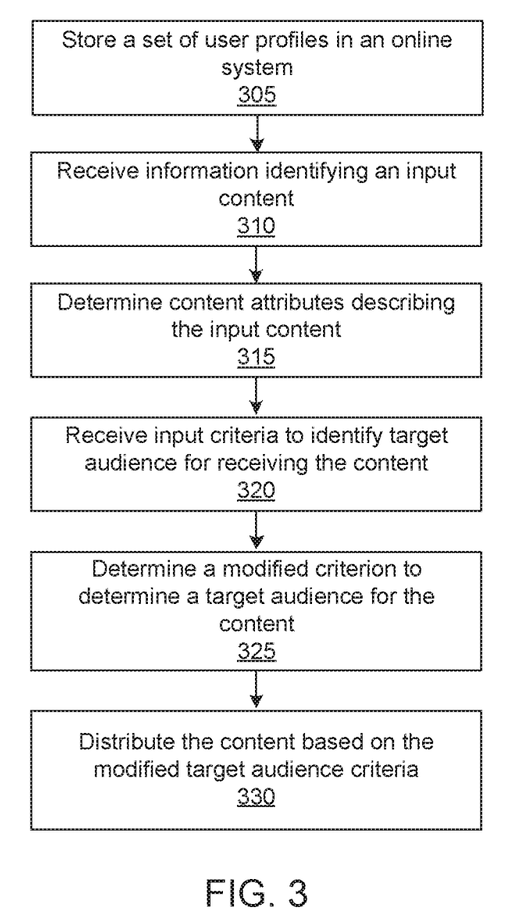
FIG. 3 is a flowchart illustrating the process for determining a modified target audience criteria, in accordance with the embodiment.

FIG. 3 is a flowchart representing the determination of modified target audience determination criteria, in accordance with the embodiment. The user profile store 205 stores a set of user profiles into a user profile store. The user profiles include various attributes describing the users including attributes received from the users and user attributes inferred by the user attribute determination module 240.

The content store 215 receives and stores information identifying an input content item. A user associated with the content provider system 150 may upload the content item into the online system 160. Alternatively, the content item may be stored in an external system and the online system 160 receives a uniform resource locator (URL) pointing at the content item. The online system 160 also receives information identifying the provider of the content.

The content attribute determination module 235 determines various content attributes that describe the input content based on the information describing the content as well as information describing the content provider, other content related to the input content item, various products and services offered by the content provider, and so on. The content attribute determination module 235 receives one or more URLs associated with the content provider providing the content item or other content providers similar to that content provider, for example, URLs of websites associated with the content providers. The content attribute determination module 235 retrieves information describing the content provider from the URLs. The content attribute determination module 235 performs analysis of text associated with the content item and the content provider to determine various topics associated with the content item.

The target audience determination module 100 receives 320 from the content provider system 150, the target audience criteria for identifying the target audience receiving the content. The target audience criteria may be specified as one or more expressions describing sets or ranges of values of user attributes. The target audience determination module 100 parses the expression representing the target audience criteria to determine various user attributes and the possible values or ranges of values for each user attribute specified in the target audience criteria.

The target audience determination module 100 determines a modified criterion for identifying a target audience for the content such that the users satisfying the modified criteria are more likely to be interested in the content than the users satisfying the original target audience criteria. The user interface manager 265 configures for presentation, user interfaces comprising information describing recommendations for modifying the target audience criteria to the user. For example, for each user attribute specified in the modified target audience criteria, the user interface manager 265 sends one or more sub ranges of values or sets of values to the user. Each sub-range of value or set of values is associated with a subset of users. The user interface manager 265 may send one or more sub ranges of values or sets of values of user attributes that are not specified in the target audience criteria. For example, the target audience criteria may specify sets of values for age and the user interface manager 265 may present sets of values for attributes representing genders or locations. Each subset of values or sub-ranges of a user attribute is associated with a subset of users.

The user interface manager 265 also sends estimates of measures of likelihood of users of each subset being interested in the content item. This allows the content provider to determine which ranges or sets of values are likely to provide the maximum return on investment for the cost associated with sending the content item to target audience. The content provider may accept a proposed range or set of values, reject it, or modify it. The target audience determination module 100 determines the final modified target determination criteria based on the input from the content provider.

The content distribution module 270 distributes 330 the content item to the set 120 of users that satisfy the modified target audience determination criteria. The modified target audience determination criteria comprises one or more expressions specifying values of user attributes that users satisfying the modified target determination criteria should have. In an embodiment, the content distribution module 270 interacts with the user profile store 205 to access user profiles that have user attribute values as specified by the modified target determination criteria. The content distribution module 270 sends the content to the determined set of users. The content distribution module 270 may send textual content as an email, newsfeed, or using any other channel configured for communicating text. The content distribution module 270 may send video or audio content as a URL or by pushing the content item to the client device 130 or as a URL to a website hosting the content. Video or audio content may be provided to the user along with other related content. For example, a sponsored content item may be embedded as part of a larger content item, for example, a web page.

Figure 4:
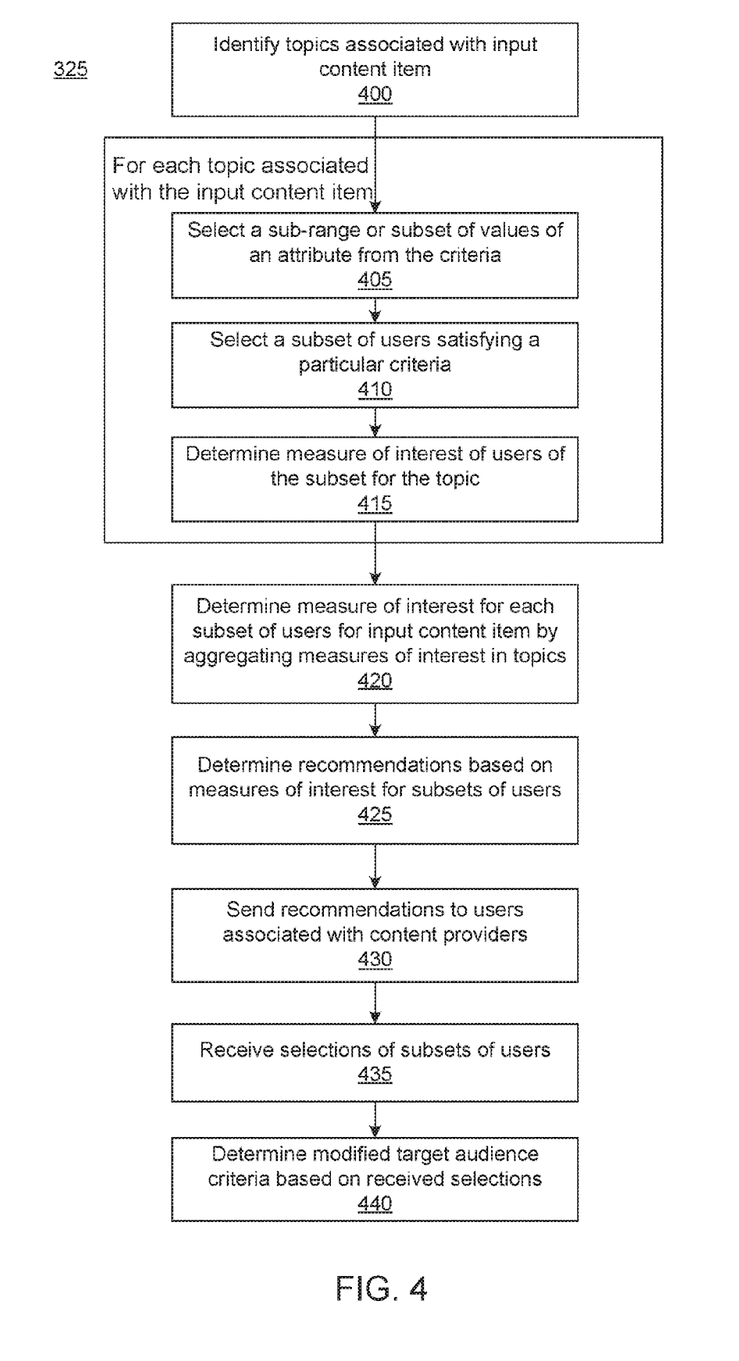
FIG. 4 is a flowchart illustrating details of the process used for modifying the target audience criteria, in accordance with the embodiment.

FIG. 4 is a flowchart illustrating details of the process used for modifying the target audience criteria, in accordance with the embodiment. The content attribute determination module 235 identifies 400 topics associated with the input content item. The recommendation module 290 performs the steps 410 and 415 for each topic that is associated with the input content item. The recommendation module 290 selects an attribute for which a range is specified in the target audience criteria and selects a sub-range of the range. Alternatively, if the target audience criterion specifies a set of values for an attribute, the recommendation module 290 selects a subset of the set of value. Alternatively, if the attribute is not specified in the target audience criteria, the recommendation module 290 selects a subset of possible values for the attribute or a range of values that the attribute can have. These subsets of values or sub-ranges of values of attribute correspond to the subsets or sub-ranges of values of the attribute for which statistical information is stored in the population statistics store 275.

The recommendation module 290 selects 410 the subset of users corresponding to the sub-range or subset of values for the attribute. The recommendation module 290 determines a measure of interest in the topic for the subset of users by identifying the value in the population statistics store 275. The recommendation module 290 repeats the steps 405, 410, and 415 for various subsets of users from the set of users corresponding to the target audience criteria.

The recommendation module 290 determines 420 the measure of interest for each subset of users in the content item by aggregating the measures of interest of subsets of users over the different topics associated with the content item for each subset of users. In an embodiment, the content attribute determination module 235 associates each topic with a measure of relevance with the content item. For example, if a topic is mentioned several times in text associated with the content item, the content attribute determination module 235 ranks the topic higher than a topic that is occasionally mentioned in the text. Accordingly, the content attribute determination module 235 determines a relevance score between content items and topics associated with the content item. The recommendation module 290 determines 420 a weighted aggregate of measures of interest for each topic, wherein the measure of interest for a topic is weighted by a measure of relevance of the topic to the content item.

The recommendation module 290 determines 425 recommendations based on the measures of interests in the content item for each subset of users. For example, if a subset of users has a high measure of interest for the content item, the recommendation module 290 recommends to the content provider to include the subset of users in the target audience criteria. On the other hand, if the recommendation module 290 determines that a subset of users has a low measure of interest for the content item, the recommendation module 290 suggests that the content provider exclude that subset of users in from the target audience criteria for the input content item or provide a different content item for that subset of users.

The recommendation module 290 sends 430 recommendations to the content provider for approval of any modifications to the target determination criteria. The target audience determination module 100 receives 435 selections of subsets of users from the content provider. For example, the target audience determination module 100 receives indication from the content provider that the content provider accepts certain recommendations and rejects other recommendations. The target audience determination module 100 determines 440 modified target audience determination criteria based on the feedback from the content provider.

In an embodiment, the target audience determination module 100 ranks the various subsets of users based on their measures of interests and selects one or more subsets based on the ranking and modifies the target audience determination criteria appropriately without requiring any user input. Typically, a content provider is represented by a privileged user, for example, a system administrator who interacts with the online system 160 on behalf of the content provider.

User Interfaces for Determining Target Audience for Content

Figure 5:
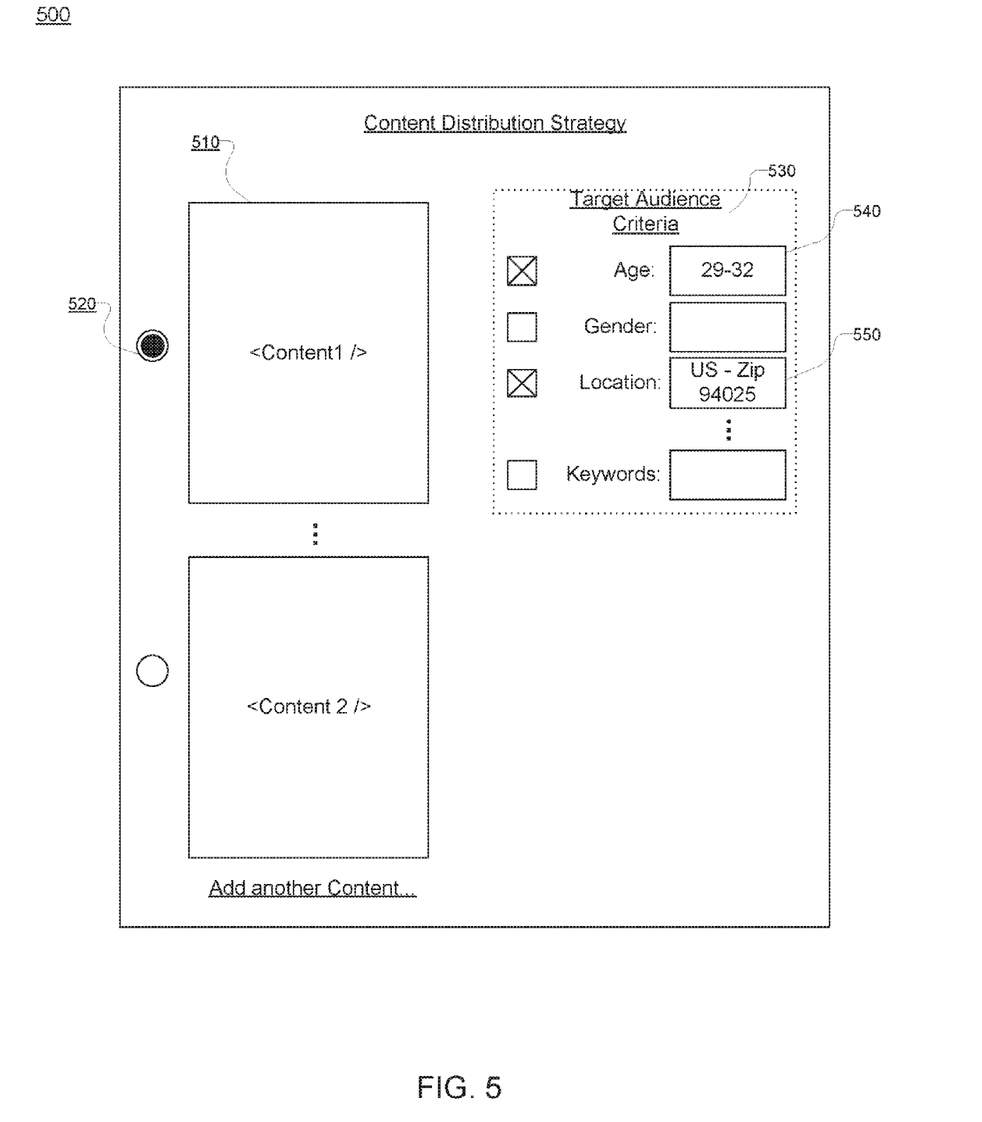
FIG. 5 is a representative user interface for receiving the target audience criteria from a content provider, in accordance with the embodiment.

FIG. 5 illustrates a user interface for allowing a content provider to specify the target audience criteria, in accordance with an embodiment. The user interface presents a widget 510 that allows the user to provide content items or list previously provided items. The user selects a content item using a widget 520, for example, a radio button for specifying target audience criteria 530 associated with the content item.

The user interface specifies various attributes describing the users and allows the user to specify ranges of values of sets of values for the attributes. For example, the user can specify a range 540 for age attribute of users or one or more zip codes for specifying location attribute. If the user does not specify a value for an attribute the target audience determination module 100 assumes that the attribute can take all values that are possible for the user attribute.

Figure 6:
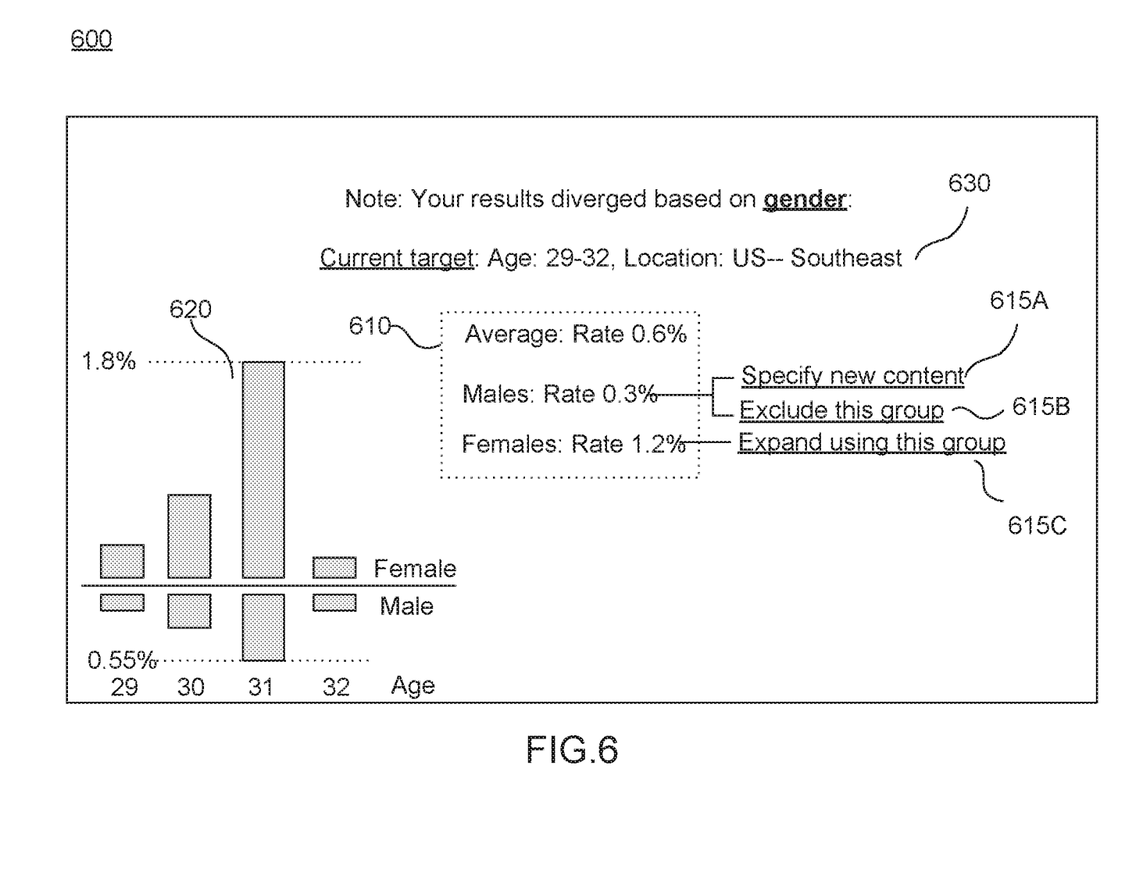
FIG. 6 illustrates a user interface for providing recommendations for modifying the target audience criteria, in accordance with an embodiment.

FIG. 6 illustrates a user interface for providing recommendations to the content provider with information useful for modifying the target audience determination criteria, in accordance with an embodiment. The user interface 600 shows the current target audience criteria 630. The user interface 600 provides information describing measures of interest in the content for various subsets of users. The measure of interest indicated in the user interface 600 is an estimated click through rate for the content item. For example, the user interface 600 shows in recommendation 610 that males have a likely click through rate of 0.3% for the content item while females have a higher click through rate of 1.2% for the content item. Accordingly, the recommendation module 290 provides recommendations to the user via the user interface 600. The recommendation 615A specifies that the content provider should consider specifying a new content for male users. The recommendation 615B specifies that the content provider should consider excluding the male users from the target audience for this content. The recommendation 615C specified that the content provider should consider expanding the group comprising female users, for example, by specifying a bigger age range or additional locations for female users.

The user interface 600 also presents distributions 620 of the expected click through rate. Accordingly, the content provider may restrict the target audience criteria to certain age groups that have high estimates of click through rates. In other embodiments, the measure of interest may be provided as a score such that higher values of the score value indicate high likelihood of interest in the content item and low score value indicates low likelihood of interest in the content item.

Figure 7:
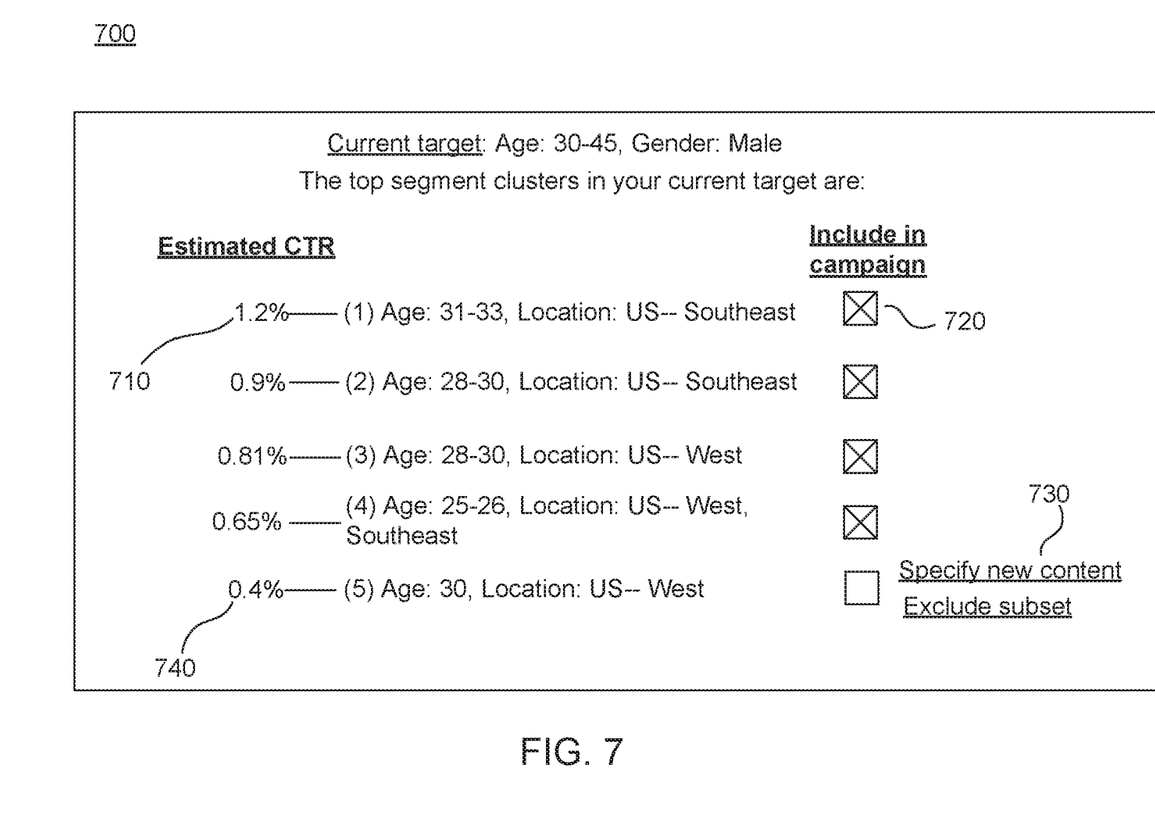
FIG. 7 illustrates a user interface for receiving modifications to the target audience criteria, in accordance with an embodiment.

FIG. 7 illustrates a user interface that allows the user to modify the target audience determination criteria, in accordance with an embodiment. The user interface 700 presents the top ranked subsets of users. The user interface 700 also presents the measures of interest associated with each attribute range or subset of values ranked according to their estimated measure of interest. The estimated measure of interest as shown in FIG. 7 is specified as an estimated CTR (click through rate) for the subset of users having that specific set of attributes when presented with the content item.

In an embodiment, the online system 160 preselects certain subsets of users that have high estimates of likelihood of interest for the content item. For example, for users having age in the range of 31-33 and location as US Southeast, the estimated CTR of 1.2% is determined to be high, and this subset is preselected as indicated by the widget 720. Similarly, subsets of users corresponding to age in the range of 28-30 and location as US Southeast, age in the range of 28-30 and location as US West, age in the range of 25-26 and location as US West, Southeast are also preselected. However, the subset of users having age of 30 and location as US West is not preselected since it has a low estimated CTR 740 of 0.4% and is associated with recommendations 730 to specify new content for this particular subset of users and exclude this subset of users.

In an embodiment, the content provider provides an estimate of total budget that the content provider is willing to spend for distribution of content, for example, sponsored content. The process of providing recommendations for modifying the target audience criteria are triggered of the number of users based on the specified criteria is very large and sending the content to all the users according to the specified target audience criteria would result in a total cost that exceeds the specified budget.

Alternative Embodiments

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   storing, by an online system, a set of user profiles describing users of the online system, each user profile comprising one or more user attributes describing a user;
   receiving, by the online system, information identifying an input content item for sending to users of the online system;
   configuring a first user interface to a client device, the first user interface configured to receive a target audience criteria for selecting users for receiving the input content item, the first user interface comprising a widget for mapping a user attribute to a set of values;
   sending the first user interface to the client device;
   receiving, via the first user interface a target audience criteria;
   identifying one or more content attributes describing the input content item;
   determining a plurality of subsets of values of the user attribute, each subset of values associated with a set of users having a value from the subset of values for the user attribute;
   configuring a second user interface comprising a plurality of widgets, each widget associated with a subset of values of the user attribute, the second user interface displaying in connection with the widget, a measure of interest of users of the subset of users in the input content item, wherein the measure of interest is determined as a value inversely related to the number of past interactions with a matching content item indicating a dislike towards the matching content item, wherein the matching content item has content attributes matching content attributes of the input content item;
   sending the second user interface to the client device;
   receiving, via one or more widgets from the plurality of widgets of the second user interface, a selection of a subset of values;
   determining a modified target audience criteria based on the selected subset of values; and distributing the input content item to users selected based on the modified target audience criteria.

2. The method of claim 1, further comprising:
identifying one or more matching content items that have content attributes matching content attributes of the input content item, and
wherein determining the measure of interests of users of the subset of users in the input content item is based on past interactions of users of the subset with the one or more matching content items.

3. The method of claim 1, wherein an interaction indicating dislike of a user towards a content item comprises:
the user flagging the content item as inappropriate, or
the user hiding the content item.

4. The method of claim 2, wherein:
determining the measure of interest of the users comprises determining a measure of likelihood of interaction of the users with the input content item as a value directly proportionate to the number of past interactions with a matching content item, indicating an affinity towards the matching content item.

5. The method of claim 4, wherein past interactions of a user with an identified content item, indicating an affinity towards the matching content item, comprise one or more of:
the user liking the matching content item,
the user commenting on the matching content item,
the user recommending the matching content item,
the user forwarding the matching content item, or
the user performing a financial transaction associated with the matching content item.

6. The method of claim 1, wherein a content attribute of the input content item describes metadata associated with the input content item.

7. The method of claim 1, wherein a content attribute of the content item describes a user who uploaded the content item.

8. The method of claim 1, wherein a content attribute of the content item describes a category of an activity presented in the content.

9. The method of claim 1, wherein a content attribute of the content item describes a category of an object presented in the content.

10. The method of claim 1, wherein a content attribute of the content item describes a topic based on keywords associated with the content.

11. The method of claim 1, wherein a content attribute of the content item describes a content provider of the content.

12. The method of claim 11, wherein a content attribute of the content item is based on other content from the content provider.

13. The method of claim 11, wherein a content attribute of the content item is based on another content provider matching the content provider.

14. The method of claim 1, wherein the content is sponsored by a content provider.

15. A non-transitory computer-readable storage medium storing executable computer program instructions for:
storing, by an online system, a set of user profiles describing users of the online system, each user profile comprising one or more user attributes describing a user;
receiving, by the online system, information identifying an input content item for sending to users of the online system;
configuring a first user interface to a client device, the first user interface configured to receive a target audience criteria for selecting users for receiving the input content item, the first user interface comprising a widget for mapping a user attribute to a set of values;
sending the first user interface to the client device;
receiving, via the first user interface a target audience criteria;
identifying one or more content attributes describing the input content item;
determining a plurality of subsets of values of the user attribute, each subset of values associated with a set of users having a value from the subset of values for the user attribute;
configuring a second user interface comprising a plurality of widgets, each widget associated with a subset of values of the user attribute, the second user interface displaying in connection with the widget, a measure of interest of users of the subset of users in the input content item, wherein the measure of interest is determined as a value inversely related to the number of past interactions with a matching content item indicating a dislike towards the matching content item, wherein the matching content item has content attributes matching content attributes of the input content item;
sending the second user interface to the client device;
receiving, via one or more widgets from the plurality of widgets of the second user interface, a selection of a subset of values;
determining a modified target audience criteria based on the selected subset of values; and
distributing the input content item to users selected based on the modified target audience criteria.

16. The computer-readable storage medium of claim 15, further storing instructions for:
identifying one or more matching content items that have content attributes matching content attributes of the input content item; and
determining the measure of interests of users the subset of users in the input content item is based on past interactions of users of the subset with the one or more matching content items.

17. The computer-readable storage medium of claim 15, wherein an interaction indicating dislike of a user towards a content item comprises:
the user flagging the content item as inappropriate, or
the user hiding the content item.

18. The computer-readable storage medium of claim 16, further storing instructions for:
determining a measure of interest of the users comprises determining a measure of likelihood of interaction of the users with the input content item as a value directly proportionate to the number of past interactions with a matching content item indicating an affinity towards the matching content item.

19. The computer-readable storage medium of claim 15, wherein a content attribute of the content item describes one or more of:
a user who uploaded the content item,
a category of an activity presented in the content,
a category of an object presented in the content, or
a topic based on keywords associated with the content.

20. A computer-implemented method comprising:
storing, by an online system, a set of user profiles describing users of the online system, each user profile comprising one or more user attributes describing a user;
receiving, by the online system, information identifying an input content item for sending to users of the online system;

configuring a first user interface to a client device, the first user interface configured to receive a target audience criteria for selecting users for receiving the input content item, the first user interface comprising a widget for mapping a user attribute to a set of values;

sending the first user interface to the client device;

receiving, via the first user interface a target audience criteria;

identifying one or more content attributes describing the input content item;

determining a plurality of subsets of values of the user attribute, each subset of values associated with a set of users having a value from the subset of values for the user attribute;

configuring a second user interface comprising a plurality of widgets, each widget associated with a subset of values of the user attribute, the second user interface displaying in connection with the widget, a measure of interest of users of the subset of users in the input content item, wherein the measure of interest is determined as a value inversely related to the number of past interactions with a matching content item indicating a dislike towards the matching content item, wherein the matching content item has content attributes matching content attributes of the input content item;

sending the second user interface to the client device;

receiving, via one or more widgets from the plurality of widgets of the second user interface, a selection of a subset of values; and recommending a modified target audience criteria based on the selected subset of values, wherein the modified target audience criteria is used for distributing the input content item to users that satisfy the modified targeting criteria.

* * * * *